United States Patent Office 3,061,498
Patented Oct. 30, 1962

3,061,498
METHOD OF VULCANIZING UNCURED TREAD RUBBER TO A USED TIRE CASING
James H. Botsford, 53 Rolls Ave., St. Catharines, Ontario, Canada
No Drawing. Filed Apr. 20, 1959, Ser. No. 807,325
6 Claims. (Cl. 156—96)

This invention relates to the vulcanizing of uncured tread rubber to used tire treads.

The most commonly employed method of retreading tires requires the use of a mould, heat being supplied to the mould to vulcanize the rubber which is applied to the tire carcass.

I have now found that used rubber tires retreaded in a mould will always change shape when inflated for service and cause varying degrees of tension in the new rubber and in the bond because no mould will exactly duplicate the inflated shape of a used tire.

Moreover, while I am aware that retreading methods are in use which do not require moulds, the principal methods of which I am aware which involve retreading of tires in a steam chamber are even more unsatisfactory than is the case with moulded tires since the tire changes shape even more in a steam chamber than it does in a mould, again creating rubber tension when the tire is inflated and put in use.

It is the principal object of this invention therefore to provide a method of vulcanizing tires to retread or repair the same which will obviate deleterious tension in the rubber and the bond under operating conditions.

It is another important object of this invention to provide such a method as will provide a more stable vulcanizing of the rubber and thus one capable of providing better service under running conditions.

It is another important object of this invention to provide a method as will not require the use of moulds.

These and other advantageous objects will become apparent through a consideration of the following detailed description.

Vulcanization of rubber onto tire carcasses is well known in the art. According to accepted practice, the tire carcass to be repaired or retreaded is first buffed to obtain a good base and unvulcanized rubber is bonded to it either as a tread or as a repair. The tire is then subjected to the simultaneous action of heat and pressure for a period of time whereupon the rubber becomes vulcanized.

As I have mentioned, the most common method of applying heat and pressure to such tire casings is by means of a mould; the mould being clamped together to contain the inflated tire and being heated to supply the temperature. Curing may also be effected in an autoclave or a steam chamber supplied with steam under pressure. The disadvantages of the prior art methods have already been outlined.

According to my method, the tire is given the conventional preliminary buffing and the unvulcanized rubber is bonded thereto all according to conventional methods. The uncured tread rubber is then vulcanized in a steam chamber, the difference between my process and those of the prior art using steam chambers, being that the interior of the tire casing is first inflated to such an extent that under the action of the temperature in the steam chamber, the inflated pressure of the tire is substantially greater than the pressure in the steam chamber.

In vulcanizing tires in a steam chamber, it is usual to use steam at about 45 p.s.i. and at a temperature of about 290° F. According to the method of my invention it is thus necessary to inflate the tires to such an extent that at 290° F., the pressure inflating the tire casing is substantially greater than 45 p.s.i. I have found that if the tire is first inflated in the atmosphere and at atmospheric temperature to the same pressure as exists in the steam chamber i.e. 45 p.s.i. in the example given above, the elevation in temperature experienced on placement in the pressure chamber will cause a sufficient increase in the interior pressure to raise the pressure well above that of the steam chamber.

I have found that a large truck tire inflated to 45 p.s.i. at room temperature goes up to 68 p.s.i. at 290° F.

According to the concept of this invention, the tire may be inflated by any desirable or available method. Obviously the simplest and most practical method of inflating the interior of the tire is to insert an inner tube (in the case of tube tires) and mount it on a rim, and inflate it in exactly the same manner as when in service. Accordingly this is the preferred method of my invention and a preferred embodiment contemplates mounting the tire to be treated on the same width rim on which it is to run when in service and inflate the inner tube to the required extent.

It is possible to use a regulator and to inflate or maintain inflation at a desired level after the tire is in the autoclave. The necessity for special equipment makes this less desirable however.

It will be appreciated that mounting the tire for vulcanization on the same width rim as it runs for service will absolutely ensure that the tire will conform exactly to the service conditions required obviating the difficulties caused by the prior art methods using moulds.

Because the interior of the tire is supported against the pressure existing in the steam chamber, the uncured tread rubber becomes vulcanized without change of shape of the tire carcass in the process of vulcanization. This tends to reduce or virtually eliminate failures due to the strain between the tire and the new rubber and also provides a much better bond between the new rubber and the tire through the complete elimination of tension in the rubber. This elimination of tension will, moreover, improve the resistance of the tire to cutting and also provide greatly increased service from the new tread rubber for the same reason.

The invention has been described with reference to preferred embodiments. It is to be understood that the invention is not limited to such embodiments and such embodiments of the invention as come within the scope and purview of the appended claims are to be considered as part of this invention.

What I claim as my invention is:

1. The method of vulcanizing uncured tread rubber to a used tire casing which comprises bonding the unvulcanized rubber to the casing, and vulcanizing the rubber, without a mould, under the action of heat and pressure applied by introducing the tire into a steam chamber supplied with steam at the required temperature and pressure, the casing being mounted on a rim and inflated to such an extent that under the action of the heat, the inflated pressure of the tire is substantially greater than the pressure applied to the exterior of said tire.

2. The method of vulcanizing uncured tread rubber to a used tire casing mounted on a rim which comprises bonding the unvulcanized rubber to the casing, inflating the interior of the casing while mounted on a rim, and vulcanizing the rubber, without a mould, under the action of heat and pressure applied by introducing the tire into a steam chamber supplied with steam at the required temperature and pressure, the interior of the casing being inflated to such an extent that under the action of the heat, the inflated pressure of the tire is substantially greater than the pressure applied to the exterior of said tire.

3. The method of claim 2 wherein the steam chamber is maintained at a pressure about 45 p.s.i. and at a temperature of about 290° F.

4. The method of claim 1 wherein the tire casing is mounted on a rim of the same width as that on which the tire is to run in service.

5. The method of claim 2 wherein the tire is inflated under ambient temperature to a pressure substantially equal to the pressure to be applied for vulcanization.

6. A method of claim 1 wherein said used tire casing is inflated under ambient temperature to a pressure substantially equal to the pressure to be applied to the exterior of said tire for vulcanization.

References Cited in the file of this patent

UNITED STATES PATENTS

| | | |
|---|---|---|
| 1,306,602 | McEwen | June 10, 1919 |
| 1,707,014 | Hopkinson | Mar. 26, 1929 |
| 2,256,631 | Steele | Sept. 23, 1941 |
| 2,292,286 | Owen | Aug. 4, 1942 |
| 2,418,166 | Dinmore et al. | Apr. 1, 1947 |
| 2,428,944 | Schrank | Oct. 14, 1947 |
| 2,515,064 | Tritt et al. | July 15, 1950 |

FOREIGN PATENTS

| | | |
|---|---|---|
| 555,680 | Great Britain | Sept. 2, 1943 |